United States Patent [19]
Schott

[11] 4,159,884
[45] Jul. 3, 1979

[54] CUTTING TOOL
[76] Inventor: Lawrence A. Schott, 15940 Warwick, Detroit, Mich. 48223
[21] Appl. No.: 825,967
[22] Filed: Aug. 19, 1977

Related U.S. Application Data
[63] Continuation-in-part of Ser. No. 812,450, Jul. 5, 1977.

[51] Int. Cl.² ............................................. B26D 1/00
[52] U.S. Cl. .................................................. 407/113
[58] Field of Search ................ 407/114, 113, 118, 119

[56] References Cited
U.S. PATENT DOCUMENTS

| | | | |
|---|---|---|---|
| 3,344,496 | 10/1967 | Patkay | 407/114 |
| 3,369,283 | 2/1968 | Colding | 407/119 |
| 3,381,349 | 5/1968 | Newcomer | 407/114 |
| 3,399,442 | 9/1968 | Jones et al. | 407/114 |
| 3,850,053 | 11/1974 | Bovenkerk | 407/119 |
| 3,947,937 | 4/1976 | Hertel | 407/114 |

OTHER PUBLICATIONS
American Machinist, "Bearing Land and Negative Rakes Prolong Cutting Tool Life," Aug. 2, 1945, pp. 118-121 by M. W. Purser.

*Primary Examiner*—Leonidas Vlachos
*Attorney, Agent, or Firm*—Hauke and Patalidis

[57] ABSTRACT

A cutting tool, preferably in the form of a cutting insert of hard material, having a narrow land area or ledge along the cutting edge, forming a shallow recessed groove promoting the formation of a false cutting tip build-up during use of the cutting tool, the cutting tip build-up resulting from the transfer of material from the chip to the ledge surface. The invention further contemplates favoring the formation of cutting tip build-up by providing a plurality of diamond particles embedded in the ledge surface at least at the cutting tip of the tool.

17 Claims, 15 Drawing Figures

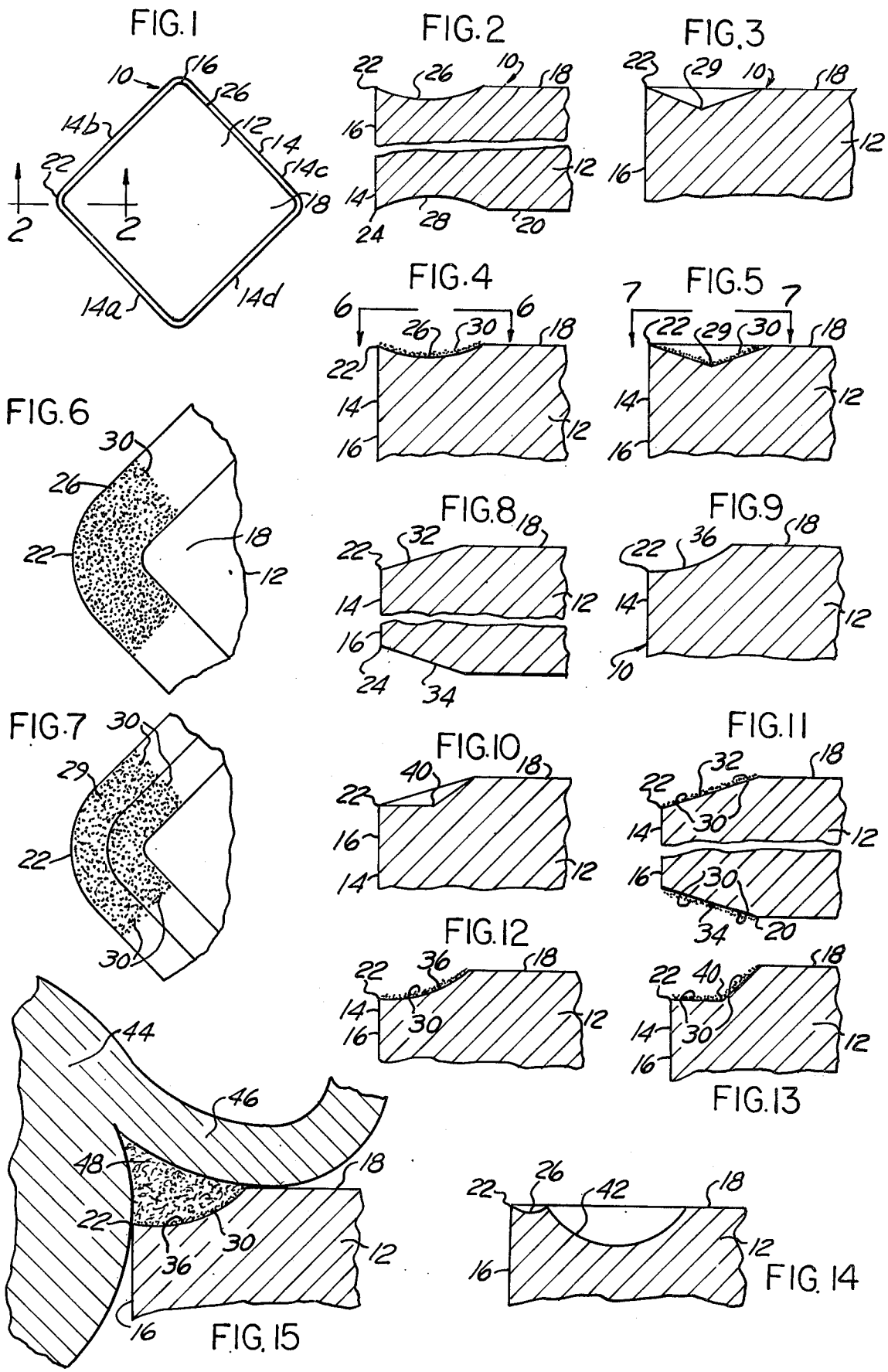

CUTTING TOOL

CROSS-REFERENCE TO RELATED APPLICATIONS

The present application is a continuation-in-part of application Ser. No. 812,450 for "Cutting Tool", filed July 5, 1977.

BACKGROUND OF THE INVENTION

The present invention relates to a cutting tool geometry in general, and more particularly to the geometry of throw-away cutting inserts so designed as to favor or promote the formation of a false cutting tip build-up at the cutting edge of the cutting tool during normal operation.

Cutting tools made of hard, wear-resistant material, such as cemented metal carbides, generally in the form of throw-away cutting inserts mounted on the tip of an appropriate tool holder, are of common use today when heavy cuts and high cutting speeds are desired. Such cutting inserts are used in combination with appropriate means for controlling the snaking chip removed from the workpiece, so as to break the continuous chip into small individual pieces which fall to the floor or into an appropriate container, without interfering with the cutting edge of the cutting tool, or with the workpiece, and without endangering the machine operator.

The chip control element, or chip breaker, may consist of a separate member which is engaged with the top surface of the cutting tool, at a position remote from the cutting edge or cutting tip and which, once clamped in position, interferes with the free flow of the continuous chip and breaks it into small pieces. Alternatively, chip breakers may take the form of appropriate recesses and rises formed integrally in a cutting insert.

During cutting of a chip from a workpiece, the cutting edge or tip of the tool is subjected to considerable stress and loads, and the material at the cutting edge itself and behind the cutting edge is subject to considerable thermal shock, intense heat and constant abrasion. A stream of coolant and lubricating fluid is generally directed as close to the cutting edge as is permissible under the particular machining conditions. However, because the cutting edge itself is generally masked by the chip being removed from the workpiece, and because of the snaking of the chip and of the random breakage of the chip into small pieces, a free flow path for the lubricant-coolant is unavailable, and the flow is constantly interfered with and interrupted, which further increases the repeated thermal shocks to which the cutting tool is subjected. All those adverse conditions result in rapid wear of the cutting tool, and rapid dulling of the cutting edge.

It has been observed that when a cutting tool removes a chip from a workpiece, a transfer of material particles occurs from the chip and the workpiece to the cutting edge and to the surface of the cutting tool proximate the cutting edge, such transfer of particles causing a false cutting tip to build up on the surface of the cutting tool from the cutting edge to a short distance behind the cutting edge. The formation of such a false cutting edge which builds up on the cutting tool is particularly pronounced when intense heat is generated at the cutting tip, and the particles of material forming the cutting edge build-up become literally welded and strongly adhering to each other, with the particles at the base of the build-up adhering to the surface of the cutting tool. Such build-up of a false cutting tip, which is continuously renewed during cutting of the chip, provides a protective element interposed between the surface of the curling chip and the surface of the cutting tool which prevents direct contact between the chip and the cutting tool surface and cutting edge, such that the life of the cutting tool is greatly improved as the false cutting tip build-up acts as a shield against abrasion of the cutting tool surface and cutting edge by direct contact with the chip, and also as a shield against thermal shocks.

It has been discovered by applicant that the formation of a false cutting tip build-up is greatly improved if the surface of the cutting tool behind the cutting edge is in the form of a very shallow groove, is rough rather than smooth, or is coated with a thin layer of diamond particles adhering to the surface. Either one of those conditions, or a combination of some or all of those conditions, greatly promotes the formation of a false cutting tip build-up on a cutting tool, particularly if precautions are taken to avoid as much as possible disturbing the formation of a free flowing chip.

SUMMARY OF THE INVENTION

According to the present invention, the formation of a false cutting tip build-up is greatly enhanced at the cutting edge of a cutting tool, such as a hard, wear-resistant insert made, for example, of cemented hard metal carbides, ceramics, and the like, by providing the insert with an appropriate geometry promoting the formation of such false cutting tip build-up.

According to the present invention, the cutting insert is provided with a shallow recessed surface forming a grooved edge extending to the insert cutting edge, the depth and the width of the ledge being so dimensioned, that the chip cut from a workpiece is free to flow into the recessed ledge without interference such as to promote the formation of a false cutting tip build-up at the cutting edge and on the ledge. The recessed ledge may be in the form of a shallow concave V-groove or a shallow curvilinear groove. The groove chord may be disposed generally at a 90° angle to the side face of the cutting tool, but preferably it is disposed at an angle of more than 90° with the side face of the cutting tool so as to provide a negative cutting angle. The surface of the ledge is preferably provided with a plurality of fine diamond particles embedded in the surface, at least at the portions corresponding to the cutting tips of the tool.

The many objects and advantages of the present invention will become more apparent to those skilled in the art when the following detailed description of the best modes contemplated for practicing the invention is read in conjunction with the accompanying drawings wherein like reference numerals relate to like parts throughout the several views, and in which:

BRIEF DESCRIPTION OF THE DRAWING

FIG. 1 is a top plan view of an example of cutting tool in the form of a cutting insert according to the present invention;

FIG. 2 is a partial sectional view thereof along line 2—2 of FIG. 1, at a greatly enlarged scale;

FIG. 3 is a view similar to FIG. 2 but showing a modification thereof;

FIG. 4 is a view similar to FIG. 2 but showing a modification thereof;

FIG. 5 is a view similar to FIG. 3, but showing a modification thereof;

FIG. 6 is a partial top plan view from line 6—6 of FIG. 4;

FIG. 7 is a partial top plan view from line 7—7 of FIG. 5;

FIG. 8 is a view similar to FIG. 2 but showing another modification thereof;

FIG. 9 is a view similar to FIG. 8 but showing a modification thereof;

FIG. 10 is a view similar to FIG. 9 but showing a further modification thereof;

FIG. 11 is a view similar to FIG. 8 but showing a modification thereof;

FIG. 12 is a view similar to FIG. 9 but showing a modification thereof;

FIG. 13 is a view similar to FIG. 10 but showing a further modification thereof;

FIG. 14 is a view similar to FIG. 2, at an enlarged scale yet, and showing a further modification thereof; and FIG. 15 is a schematic sectional view of a cutting insert according to the present invention while in use for effecting a cut in a workpiece.

DETAILED DESCRIPTION OF THE PREFERRED EMBODIMENTS

Referring now to the drawing and more particularly to FIGS. 1-2, a typical cutting tool according to the present invention is in the form, for example, of a polygonal insert 10, made of cemented hard metal carbide which, in the example illustrated, is a square or rectangular plate, having a body 12 provided with a square or rectangular perimeter peripheral surface 14 defining four side faces 14a, 14b, 14c, and 14d, consecutive side faces being joined by partially circular side portions 16. The insert 10 has a top surface 18 and a bottom surface 20 disposed in substantially parallel planes perpendicular to the planes of the side faces forming the peripheral surface 14.

The insert 10 may of course be of a different shape, such as triangular, rectangular, circular, pentagonal, hexagonal, etc., as is well known in the art, and instead of having rounded tips as illustrated at 16, it may be provided with sharp corners or tips. Each corner or tip 16 of the insert 10 forms a cutting tip 22 on the top and a symmetrically disposed cutting tip 24 on the bottom, four such cutting tips being formed one at each corner 16 for a square or rectangular cutting insert 10, as illustrated, and four cutting tips 24, one at each corner, being provided at the bottom of the cutting insert. When a cutting tip has been worn, another cutting tip is indexable in a cutting position, and after all the cutting tips on the top, for example, of the insert 10 are worn, the insert is flipped over, and each cutting tip 24 is indexable in turn, after the preceding cutting tip is worn.

In the structure illustrated at FIGS. 1-2, the invention contemplates forming a shallow curvilinear groove 26, when seen in section as in FIG. 2, recessed in the surface 18 of the cutting insert body 12, and extending peripherally all around and behind the perimeter formed by the upper edge of the peripheral surface 14 of the insert. Similarly, a peripheral shallow curvilinear groove 28 is disposed in the lower surface 20 of the insert body 12. The shallow grooves 26 and 28 extend radially and are parallel to the edge of the cutting insert about the whole periphery of the cutting insert body 12, as illustrated, or at least at the cutting tips 22 and 24. The width of the shallow groove 26 or 28 may vary from a fraction of one millimeter to a few millimeters, according to the depth of the cut that it is desired to take in a workpiece. The chord of the groove 26 or 28 is disposed at a 90° angle to the peripheral surface 14 of the insert body 12. As the shallow groove 26 or 28 extending to the edge 22 or 24 promotes the formation of a false cutting tip build-up and the presence of a false cutting tip build-up is most desirable when a heavy cut is taken in a workpiece, the shallow groove 26 or 28 will generally have a width of a few millimeters and be formed along the edge of massive cutting inserts, the maximum depth of the groove being in the order of 1/20 to 1/5 of the width of the groove.

As shown at FIG. 3, the shallow groove may be in the form of a V-groove 29, rather than the curvilinear shape illustrated at FIG. 2.

Preferably, and as shown at FIGS. 4 and 6 and at FIGS. 5 and 7, respectively, the shallow groove is provided with a plurality of diamond particles 30 embedded in the surface of the groove prior to sintering the cemented carbide, for example, material forming the cutting insert. The diamond particles 30 have preferably a grain size of a few microns and they are embedded in the surface of the groove, prior to sintering by pressing diamond powder particles into the surface at the appropriate portions of the grooves 26 and 28, proximate the cutting tips 22, by means of an appropriate stamp, according to a method such as disclosed, for example in U.S. Letters Pat. No. 3,369,283. After sintering, the diamond particles are solidly embedded in the surface of the grooves, and they provide a rough wear-resistant surface which substantially favors the build-up of a false cutting tip during use of the cutting tool.

FIG. 8 schematically illustrates a section at the cutting edge of a K-line type of cutting insert, wherein a flat ledge 32 is formed peripherally at the edge of the upper surface 18 of the cutting insert body 12, and a similarly disposed flat ledge 34 is formed peripherally on the lower surface 20 of the cutting insert body. The flat ledges 32 and 34 form respectively with the peripheral surface 14 of the cutting insert body 12 negative cutting edges or tips 22 and 24 when the cutting insert is mounted in a conventional insert holder, not shown. It has been found that such negative cutting edge arrangement, that is when the angle at the cutting edge or tip 22 or 24 is greater than 90°, greatly favors the formation of a false cutting tip build-up during use of the tool, especially when the surfaces of the ledges 32 and 34 are left with a rough surface finish and, preferably, when the ledges 32 and 34 rather than being flat, as illustrated at FIG. 8, are in the form of a shallow groove 36, as illustrated at FIG. 9, or in the form of a V-groove 40, as shown at FIG. 10.

FIG. 11 illustrates the flat ledges 32 and 34 of FIG. 8 provided with diamond particles 30 embedded in the surface thereof, and FIGS. 12 and 13, respectively, illustrate the shallow curvilinear groove 36 and the V-shaped groove 40, respectively, provided with diamond particles 30 embedded in the surface of the grooves. Such structures, as previously mentioned, greatly enhance the formation of a false cutting tip build-up on the tool.

As illustrated at FIG. 14, the principle of the invention is applicable to cutting tools or inserts provided with a chip breaker groove 42 disposed parallel to the cutting edge. In conventional cutting tools, there is a flat ledge extending from the chip breaker groove 42 to the cutting edge or tip 22. The invention replaces such a flat ledge by a shallow groove 26 extending radially from the cutting edge or tip 22 to the outer edge of the chip breaker groove 42. The curvilinear groove 26 may be replaced by a V-groove, as precedently explained, and the formation of a false cutting tip is further enhanced if the surface of the groove is left rough or provided with embedded particles of diamond, not shown at FIG. 14.

FIG. 15 is a schematic illustration of a cutting tool according, for example, to the structure of FIG. 12, being used for removing from a workpiece 44 a chip 46. During cutting of the chip 46, removed from the workpiece 44, a false cutting tip 48 is formed as a result of the transfer or metal particles from the continuous chip 46 and form the surface of the workpiece 44 rubbing against the cutting edge 22. The false cutting tip 48 is formed in the groove 36 and provides a thermal and mechanical protective shield for the cutting edge or tip 22.

If it is desired to control the chip 46, appropriate chip breakers, not shown, may be used to break the chip 46 into small manageable segments.

Having thus described the present invention by way of typical examples of structures of cutting tools appropriately designed to promote the formation of a false cutting tip build-up, what is claimed as new is as follows:

1. In a cutting tool comprising a plate of a single hard material having a bottom surface, a top surface and a peripheral surface whereby said peripheral surface and at least said top surface forms a cutting edge at their junction defining at least one cutting tip, the improvement of a perimetric shallow groove in at least said top surface, said perimetric shallow groove having an edge disposed at said cutting edge and extending radially from said cutting edge at least at said cutting tip for promoting the formation of a false cutting tip build-up during use of said cutting tool, said perimetric shallow groove having a rough surface providing an anchoring surface for said false cutting tip build-up.

2. The cutting tool of claim 1 wherein both said top and bottom surfaces are provided with said groove.

3. The cutting tool of claim 1 wherein said perimetric groove is in the form of a V-groove.

4. The cutting tool of claim 3 wherein at least the surface of said perimetric groove at the cutting tip of said tool has a plurality of diamond particles embedded in said surface.

5. The cutting tool of claim 1 wherein said perimetric groove is curvilinear in radial section.

6. The cutting tool of claim 4 wherein at least the surface of said perimetric groove at the cutting tip of said tool has a plurality of diamond particles embedded in said surface.

7. The cutting tool of claim 1 wherein at least the surface of said perimetric groove at the cutting tip of said tool has a plurality of diamond particles embedded in said surface.

8. The cutting tool of claim 1 wherein at least said top surface has a portion of said cutting tip disposed at an angle greater than 90° with said peripheral surface, and said portion is provided with said perimetric groove.

9. The cutting tool of claim 8 wherein said perimetric groove is in the form of a V-groove.

10. The cutting tool of claim 9 wherein at least the surface of said perimetric groove at the cutting tip of said tool has a plurality of diamond particles embedded in said surface.

11. The cutting tool of claim 9 wherein said perimetric groove is curvilinear in radial section.

12. The cutting tool of claim 11 wherein at least the surface of said perimetric groove at the cutting tip of said tool has a plurality of diamond particles embedded in said surface.

13. The cutting tool of claim 8 wherein at least the surface of said perimetric groove at the cutting tip of said tool has a plurality of diamond particles embedded in said surface.

14. In a cutting tool having a cutting edge for removing a chip from a workpiece, a false cutting edge retaining portion extending from said cutting edge, said portion being relatively narrow and having a relatively rough surface providing an anchoring surface for said false cutting tip formed by transfer of material from the chip removed from the workpiece.

15. The cutting tool of claim 14 wherein said surface is disposed in a groove.

16. The cutting tool of claim 14 wherein said surface has a plurality of diamond particles embedded therein.

17. The cutting tool of claim 15 wherein said surface has a plurality of diamond particles embedded therein.

* * * * *

UNITED STATES PATENT AND TRADEMARK OFFICE
CERTIFICATE OF CORRECTION

PATENT NO. : 4,159,884

DATED : July 3, 1979

INVENTOR(S) : Lawrence A. Schott

It is certified that error appears in the above-identified patent and that said Letters Patent are hereby corrected as shown below:

Column 4, line 9, change "fulse" to --false--.

Column 5, line 17, change "form" to --from--.

Column 6, line 7, change "4" to --5--.

line 25, change "9" to --8--.

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*